(12) United States Patent
Chen

(10) Patent No.: US 11,902,448 B2
(45) Date of Patent: Feb. 13, 2024

(54) HYBRID BLOCKCHAIN ARCHITECTURE WITH COMPUTING POOL

(71) Applicant: The Flowchain Foundation Limited, Singapore (SG)

(72) Inventor: Jun-Hong Chen, Taipei (TW)

(73) Assignee: THE FLOWCHAIN FOUNDATION LIMITED, Singapore (SG)

(*) Notice: Subject to any disclaimer, the term of this patent is extended or adjusted under 35 U.S.C. 154(b) by 465 days.

(21) Appl. No.: 17/289,179

(22) PCT Filed: Dec. 28, 2018

(86) PCT No.: PCT/SG2018/050634
§ 371 (c)(1),
(2) Date: Apr. 27, 2021

(87) PCT Pub. No.: WO2020/139190
PCT Pub. Date: Jul. 2, 2020

(65) Prior Publication Data
US 2021/0399896 A1    Dec. 23, 2021

(51) Int. Cl.
H04L 9/32    (2006.01)
H04L 9/08    (2006.01)
H04L 9/00    (2022.01)

(52) U.S. Cl.
CPC .......... *H04L 9/3239* (2013.01); *H04L 9/0825* (2013.01); *H04L 9/3265* (2013.01); *H04L 9/50* (2022.05); *H04L 2209/42* (2013.01)

(58) Field of Classification Search
CPC ... H04L 9/3239; H04L 9/0825; H04L 9/3265; H04L 9/50; H04L 2209/42; H04L 9/3263; H04L 63/0421; H04L 67/10; H04L 67/12; H04L 2209/805; H04W 4/70
See application file for complete search history.

(56) References Cited

U.S. PATENT DOCUMENTS

| | | | |
|---|---|---|---|
| 2017/0031676 A1 | 2/2017 | Cecchetti et al. | |
| 2017/0046806 A1* | 2/2017 | Haldenby | ............. H04L 9/0861 |
| 2017/0279620 A1 | 9/2017 | Kravitz et al. | |
| 2018/0032273 A1* | 2/2018 | Ateniese | ............... H04L 9/0637 |

(Continued)

OTHER PUBLICATIONS

Jollen Chen, 'A Hybrid Blockchain for the IoT and Tokenized Hardware', The Linux Foundation, Open Source Summit Japan, Tokyo, Jun. 20, 2018, 46 pages [retrieved on Sep. 1, 2019]. Retrieved from the internet: <URL: https://events.linuxfoundation.org/wp-content/uploads/2017/11/Flowchain-A-Hybrid-Blockchain-for-the-IoT-and-Tokenized-Hardware-OSS-Jollen-Chen.pdf>.

(Continued)

*Primary Examiner* — Amie C. Lin
(74) *Attorney, Agent, or Firm* — Muncy, Geissler, Olds & Lowe, P.C.

(57) ABSTRACT

The present invention addresses the issue of secure and trusted Internet of Things (IoT) blockchain networks by adopting the emerging blockchain technologies. The present invention proposes a new hybrid blockchain technology to address the trusted IoT issues such as trustless communications and decentralized applications. Besides, the present invention also disclose that the pseudonymous authentication technique can use a puzzle-solving computation to enable trustless communications for the IoT and provide the capabilities of near real-time transactions.

20 Claims, 14 Drawing Sheets

(56) References Cited

U.S. PATENT DOCUMENTS

2018/0243193 A1  8/2018  Pan et al.
2020/0186509 A1* 6/2020  Kursun .............. H04L 63/1466

OTHER PUBLICATIONS

Jollen Chen, 'Flowchain: A Distributed Ledger Designed for Peer-to-Peer IoT Networks and Real-time Data', Flowchain Open Source Project, Jan. 20, 2017, 8 pages [retrieved on Sep. 1, 2019]. Retrieved from the internet: <URL: https://flowchain.co/Flowchain-WhitePaper.pdf>.

Jollen Chen, 'Hybrid Blockchain and Pseudonymous Authentication for Secure and Trusted IoT Networks', AioTAS' 18, Los Angeles, CA, United States, Jun. 2018, 7 pages [retrieved on Sep. 1, 2019]. Retrieved from the internet: <URL: https://flowchain.co/flowchain-AioTAS18_ACCEPTED.pdf>.

J0llen Chen, Devify: Decentralized internet of things software framework for a peer-to-peer and interoperable IoT device. Proceedings of the Workshop on Advances in IoT Architecture and Systems (AIoTAS2017), Jun. 2017, 6 pages.

S. Nakamoto, Bitcoin: A peer-to-peer electronic cash system. https://bitcoin.org/en/bitcoin-paper. [Retrieved on Apr. 20, 2021] 9 pages.

P. Jayachandran. The difference between public and private blockchain. https://www.ibm.com/blogs/blockchain/2017/05/thedifference-between-public-and-private-blockchain/ May 31, 2017, 8 pages.

H. Watanabe, et al, Blockchain contract: Securing a blockchain applied to smart contracts. 2016 IEEE International Conference on Consumer Electronics (ICCE), Jan. 2016, 3 pages.

Banerjee, A, et al. Special Issue on Advances in IoT Architecture and Systems, Sigbed Review, Oct. 5, 2018, 6 pages, vol. 15 No. 5.

* cited by examiner

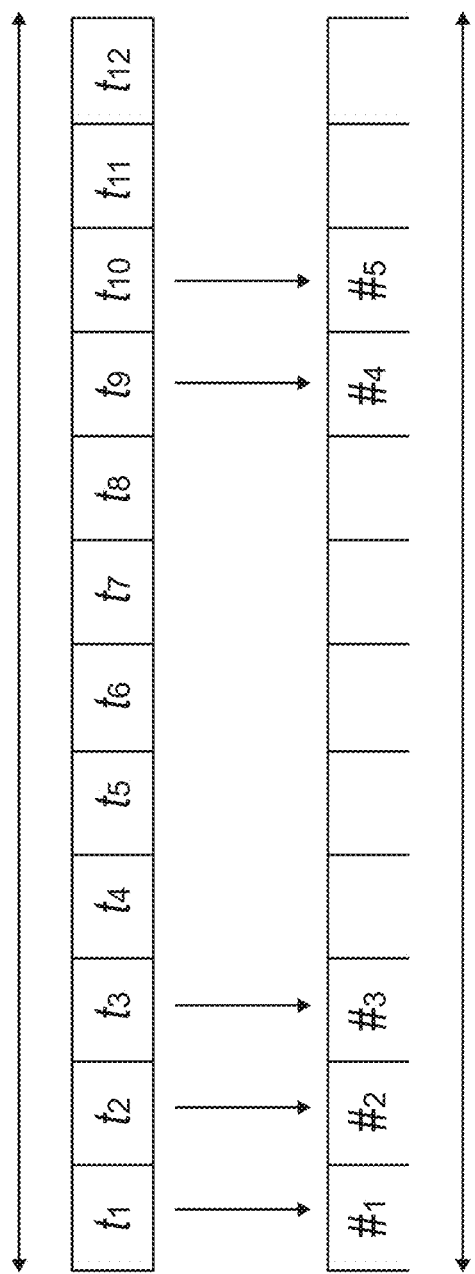

HYBRID BLOCKCHAIN ARCHITECTURE WITH COMPUTING POOL

TECHNICAL FIELD

The present invention relates to a blockchain technology, and more particularly, to a hybrid blockchain architecture with computing pool, and pseudonymous authentication for secure and trusted Internet of Things (IoT) network.

BACKGROUND

The Internet of Things (IoT) devices can generate and exchange security-critical data over the IoT network. Many IoT networks use the public-key infrastructure (PKI) to authenticate devices and ensure the data security as well as the data privacy. The IoT device has to sign the generated data by a digital public key, and deliver the data to the network for exchanging. However, such authentication method tends to be expensive for an IoT device regarding computing power and energy consumption.

Furthermore, the blockchain technology has the decentralized, secure, and private nature to become a promising idea that can be approaching the next-generation IoT architecture. Therefore, in the previous works, Devify have already been proposed to build a blockchain technology for the IoT device over a p2p network, and proposed a generic and comprehensive software framework for building various types of trust IoT networks in a decentralized manner that can execute on a variety range of hardware devices, such as cloud servers, mobile devices, and resource-constrained devices (J. Chen. Devify: Decentralized internet of things software framework for a peer-to-peer and interoperable IoT device. Proceedings of the Workshop on Advances in IoT Architecture and Systems (AIoTAS2017), 2017.).

The traditional public blockchains, such as Bitcoin (S. Nakamoto. Bitcoin: A peer-to-peer electronic cash system. https://bitcoin.org/en/bitcoin-paper) and Ethereum, use proof-of-work (PoW) consensus system; however, the PoW consensus system does not provide the ability of near real-time transactions.

The blockchains could be either a public blockchain or a private blockchain (P. Jayachandran. The difference between public and private blockchain. https://www.ibm.com/blogs/blockchain/2017/05/thedifference-between-public-and-private-blockchain/). Anyone can join the public blockchain network, meaning that the blockchain network is entirely open to users for submitting transactions, accessing shared ledgers, and mining. More specifically, the public blockchain can enable a decentralized model that it can operate without any central authorizations; thus, the public blockchain has the natures of openness and trust. Unlike public blockchains, only authenticated users can join the private blockchain network. The user needs to request permissions from an authority in the private blockchain for joining the network. The authority validates the authenticity of a user, and grant permissions to authenticated users for submitting transactions and accessing shared ledgers. The conventional blockchain creates openness and trust of transactions in the public blockchain, and protect the privacy-sensitive data in the private blockchain. Such technique has already been proposed to secure blockchains and applied to digital rights management (H. Watanabe, S. Fujimura, A. Nakadaira, Y. Miyazaki, A. Akutsu, and J. Kishigami. Blockchain contract: Securing a blockchain applied to smart contracts. 2016 IEEE International Conference on Consumer Electronics (ICCE), 2016).

The present invention proposes a new blockchain technology to address the trusted IoT issues and achieve a secure and inexpensive blockchain for the IoT.

SUMMARY OF THE INVENTION

Therefore, to achieve a secure and inexpensive blockchain for sharing the computing resource, the present invention proposes a hybrid blockchain architecture with computing pool to share the resource and enable fast authentication by eliminating the concept of traditional PKI methods. Furthermore, the present invention discloses a distributed computing pool built by the communication blockchain network and the Internet of Things (IoT) blockchain network to share a computing capability.

According to an aspect of the invention, a hybrid blockchain architecture comprises a hybrid blockchain node; an Internet of Things (IoT) blockchain network coupled to hybrid blockchain node; and a communication blockchain network coupled to the hybrid blockchain node, wherein the communication blockchain network is selected from an internet network, wifi network, Bluetooth network and telecommunication network; wherein a distributed computing pool is built by the communication blockchain network and the Internet of Things (IoT) blockchain network to share a computing capability for a device. The hybrid blockchain node is used to distribute computing within the computing pool.

According to one aspect of the invention, the distributed computing pool includes distributed miners. IoT network uses a pseudonymous public-key infrastructure (PPKI) to authenticate IoT devices and ensure data security as well as data privacy. The hybrid blockchain node is employed to participate Byzantine agreement of the IoT blockchain network, and authenticating participants of IoT devices. The IoT devices in the Internet of Things (IoT) blockchain network decide which data can be public by submitting transactions of data to the communication blockchain network. Internet of Things (IoT) blockchain network has multiple IoT nodes.

According to another aspect of the invention, the communication blockchain network can verify the transactions and record the verified transactions in distributed ledgers across the puzzle miners. A large amount of data is collected from the puzzle miners and sent back to said computing pool. AI computed by the miners is sent back to the IoT blockchain network for upgrading AI of IoT devices.

The architecture further comprises a machine learning network to determine which transactions can be submitted to the communication blockchain network. The IoT blockchain network is built for customized products and services. A tokenized hardware is employed to provide a unique and secure authentication for edge devices to allow the computing pool to trust received data, and give the unique and secure authentication for miners to allow the computing pool to trust delivered data.

In the communication blockchain network, a puzzle miner can verify transactions from a pseudonymously authenticated node. The communication blockchain network can agree on the transactions by proof-of-work consensus. IoT nodes in the Internet of Things (IoT) blockchain network can self-organize as a per to-peer network.

Each of the IoT nodes in the Internet of Things (IoT) blockchain network has a local blockchain that keeps a privacy-sensitive data. The local blockchain starts from a genesis block and is chained by virtual blocks mined by a local miner executing on the IoT node. IoT nodes can use the virtual blocks to store local transactions. IoT nodes can temporarily store their transactions in the virtual blocks and submit the stored transactions to the Internet of Things (IoT) blockchain network for replicating.

IoT nodes can submit real-time sensitive transactions immediately to the communication blockchain network and save the transactions in the virtual blocks, IoT nodes can gather and store none real-time sensitive transactions in the virtual blocks as well, and the IoT nodes can submit the virtual blocks to the Internet of Things (IoT) blockchain network for data replication.

BRIEF DESCRIPTION OF THE DRAWINGS

The components, characteristics and advantages of the present invention may be understood by the detailed descriptions of the preferred embodiments outlined in the specification and the drawings attached:

FIG. 9a illustrates a local mining in accordance with the invention.

DETAILED DESCRIPTION

Figure 1:
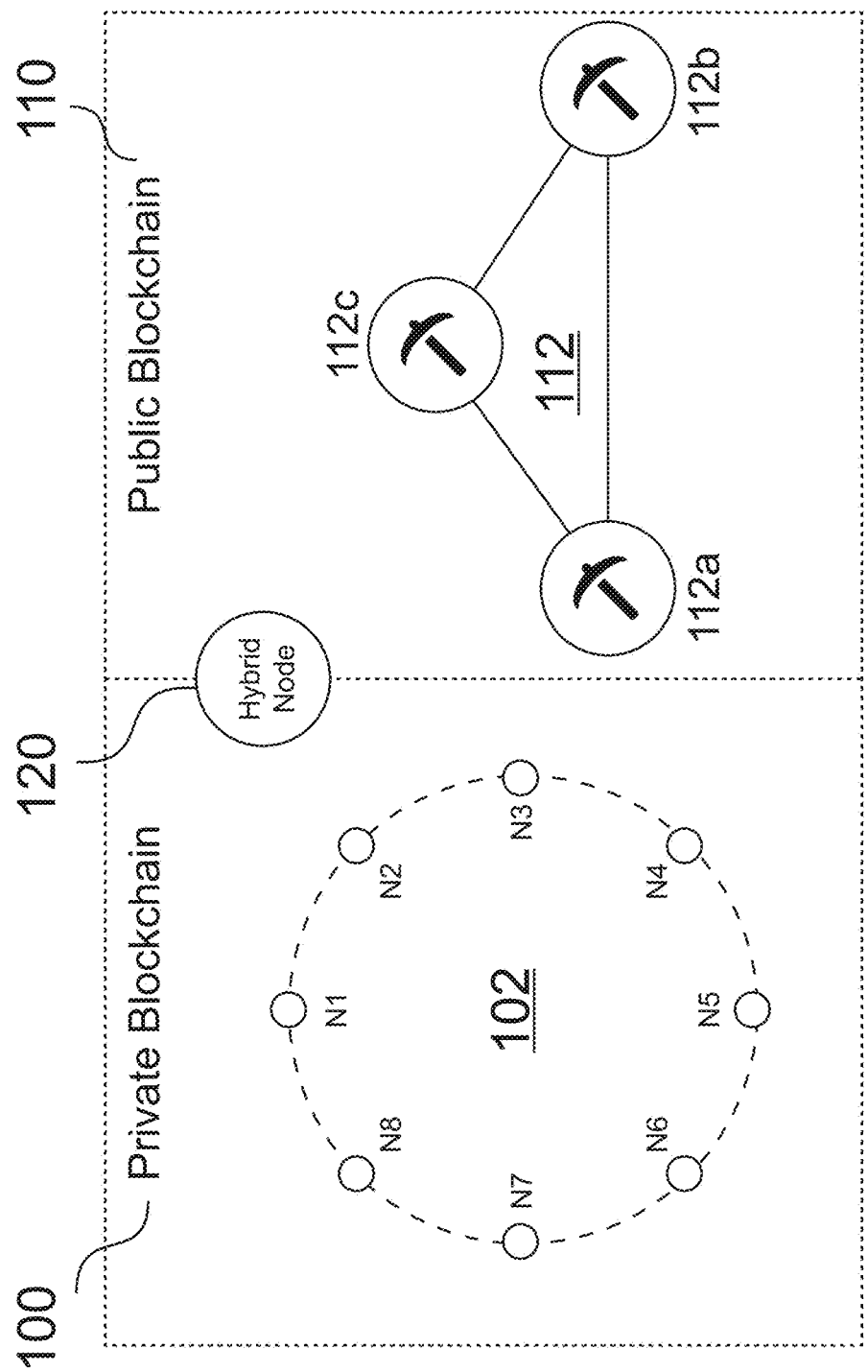
FIG. 1 illustrates core components of the hybrid blockchain design of the invention.

Some preferred embodiments of the present invention will now be described in greater detail. However, it should be recognized that the preferred embodiments of the present invention are provided for illustration rather than limiting the present invention. In addition, the present invention can be practiced in a wide range of other embodiments besides those explicitly described, and the scope of the present invention is not expressly limited except as specified in the accompanying claims.

The present invention addresses the issue of secure and trusted Internet of Things (IoT) blockchain networks by adopting the emerging blockchain technologies. The present invention proposes a new hybrid blockchain technology to address the trusted IoT issues such as trustless communications and decentralized applications. Besides, the present invention also discloses that the pseudonymous authentication technique can use a puzzle-solving computation to enable trustless communications for the IoT and provide the capabilities of near real-time transactions. In this invention, we outline the core components of the hybrid blockchain architecture and delve deeper the algorithms of the hybrid consensus to provide the capabilities for the hybrid blockchain technology.

The rest of the invention is organized as follow: the main components of the hybrid blockchain design are described; the model including the architecture, algorithms and the hybrid blockchain design are presented; and the IoT blockchain economy is discussed.

The invention proposes the blockchain technology for the IoT developed on Devify. In a hybrid blockchain network, the consensus system can ensure the trusted transactions among all IoT nodes in a p2p network. The blockchain for the IoT technology comprises of a p2p network system, and a consensus system. Therefore, the invention proposed an IoT blockchain technology and a mining based proof-of-stake (PoS) miner to ensure the real-time transactions for IoT blockchain. Consequently, IoT devices vary, e.g., resource constrained devices, mobile devices, and high-performance server frames that the computing power varies from devices. The invention uses the Devify software framework as the underlying p2p network system to implement such IoT blockchain technology. Thus, it can execute on various IoT devices.

Based on the application design and business logic, the hybrid blockchain architecture of the present invention involves a hybrid model by leveraging the benefits of both public and private blockchains.

The standard methods of distributed computing desire stronger notions of security, where authentication may be provided by the PKI. Nevertheless, Katz (J. Katz, A. Miller, and E. Shi. Pseudonymous broadcast and secure computation from cryptographic puzzles. 2015) describes that such methods are too strong for open and p2p networks; moreover, the study shows that a group of n nodes can generate a pseudonymous PKI by solving cryptographic puzzles at some bounded rate. As such, the nodes are validated by pseudonymous authentication rather than by true authentication. The proposed invention shows that such pseudonymous authentication method can be achieved by a hybrid blockchain model with secure and fast by encouraging public miners to generate cryptographic puzzles. Accordingly, Aspnes (J. Aspnes, C. Jackson, and A. Krishnamurthy. Exposing computationally-challenged Byzantine impostors. Technical Report YALEU/DCS/TR-1332, Yale University Department of Computer Science, July 2005) showed a Byzantine agreement model without a PKI by solving computational puzzles at some bounded rate and assume authenticated channels between honest nodes. Moreover, the proposed hybrid blockchain technology achieve pseudonymous authentication without such authenticated channels; thus, the hybrid blockchain can have unbounded number of corruptions. Also, Ramachandran (A. Ramachandran and M. Kantarcioglu, Dr. Using Blockchain and smart contracts for secure data provenance management. ArXiv e-prints, September 2017) proposed a framework to efficiently and securely capture and validate provenance data; the proposed hybrid blockchain technology can ensure such capabilities with the concept of hybrid blockchain technology.

I. Core Components

As shown in FIG. 1, it describes the main (core) components of the hybrid blockchain of the present invention. FIG. 1 illustrates core components of the proposed hybrid blockchain design. The hybrid blockchain comprises a private blockchain network 100 and a public blockchain network 110. The private blockchain network 100 is an IoT blockchain network and public blockchain network 110 is a communication blockchain network. The communication blockchain network is selected from an internet network, wife network, Bluetooth network and telecommunication network. The private blockchain network 100 is where IoT devices can store their private data and ensure their data privacy. The IoT devices in the private blockchain network 100 can decide which data can be public by submitting the transactions of the data to the public blockchain network 110. Each of the IoT nodes 102 is an IoT device (such as personal computer, smart phone, intelligent family device, etc.) that executing the Flowchain (J. Chen. Flowchain: A distributed ledger designed for peer-to-peer IoT networks and real-time data transactions. Each of the IoT nodes 102 includes a transceiver. Proceedings of the 2nd International Workshop on Linked Data and Distributed Ledgers (LDDL2), 2017) application previously proposed by this present invention. The IoT nodes can be self-organized as a peer-to-peer (p2p) network by using the Chord algorithm (Chord (p2p). https://en.wikipedia.org/wiki/Chord (peer-to-peer)) and Flowchain protocols. For example, users are represented as the IoT nodes, such as nodes N1, N2, N3, N4, N5, N6, N7, N8. Number of the IoT nodes 102 in the private blockchain network 100 is not limited. The public blockchain network 110 can verify transactions and record the verified transactions in the distributed ledgers across miners 112. The transactions in the public blockchain network 110 are public and opened to anyone (user of the IoT devices), meaning that anyone can access the transactions in the public blockchain network 110. For example, puzzle miner 112a, 112b, 112c is a computer that aims to generate the puzzles and broadcasts the puzzles to the private blockchain network 100. Each of the miners 112 includes a transceiver. The following will describe the design and purpose of the puzzle miner. Hybrid blockchain node 120 is a device that receives the puzzles from the public blockchain network 110 and delivers the puzzles over the p2p network of the private blockchain network 100. The hybrid blockchain node 120 includes a transceiver.

Figure 2:
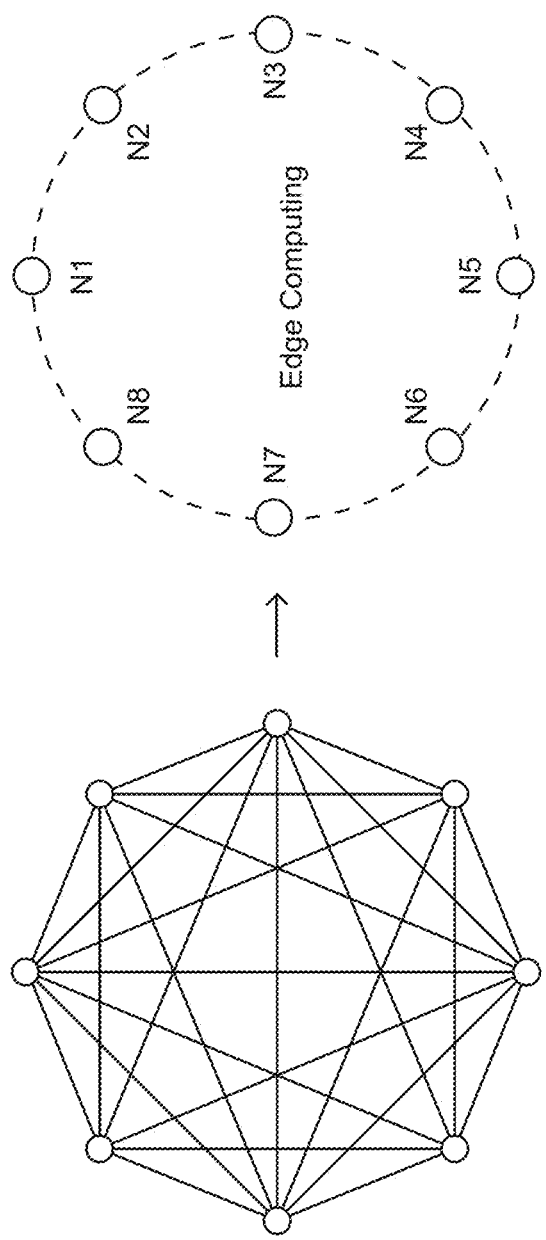
FIG. 2 illustrates a ring structure of IoT nodes in hybrid blockchain network of the invention.

As shown in FIG. 2, in such a ring structure, the MIT Chord algorithm (edge computing) is applied as node query (lookup) and finding the location of successor node. The complexity is simplified from O(log N) to O(log N/2), which greatly improves the speed of lookup.

Figure 3:
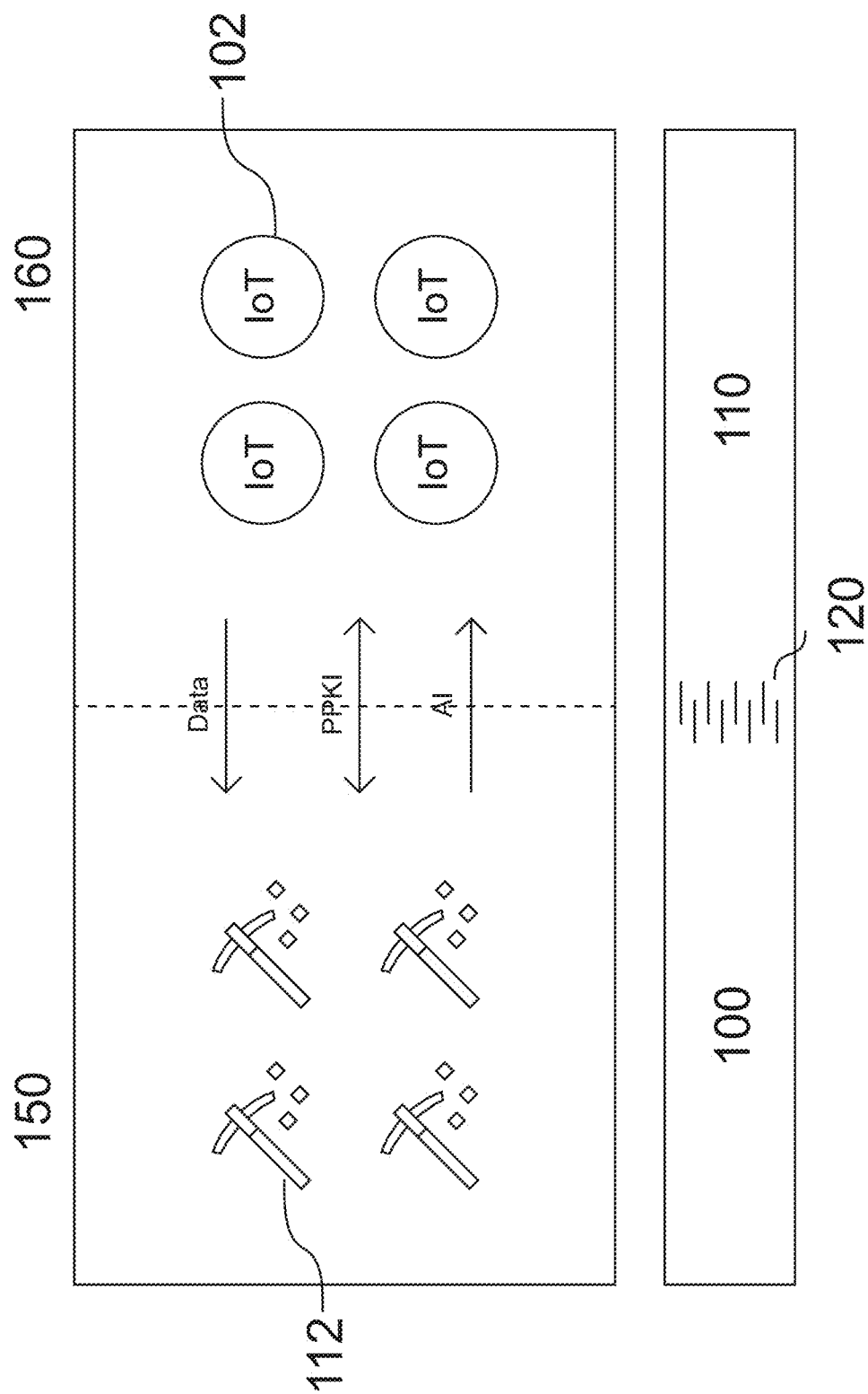
FIG. 3 illustrates a distributed computing pool built in the hybrid blockchain architecture of the invention.

As shown in FIG. 3, a distributed AI "computing pool" 150 is built in the communication blockchain network 100 through the fundamental blockchains technology. The distributed AI "computing pool" 150 includes distributed miners 112 in the world to provide the required computing. Developers of cloud computing, machine learning, AI (Artificial Intelligence) and Internet of Things can share the distributed "computing pool" 150 at relatively low cost. In the hybrid blockchain architecture, it can create a platform of business model by computing reuse and sharing for the distributed "computing pool" 150. IoT blockchain network 160 uses a pseudonymous public-key infrastructure (PPKI) to authenticate devices and ensure the data security as well as the data privacy. A large amount of data is collected from the miners 112 and sent back to the "computing pool" 150. AI computed by the miners 112 is sent back to the IoT blockchain for upgrading AI of IoT devices.

Figure 4:
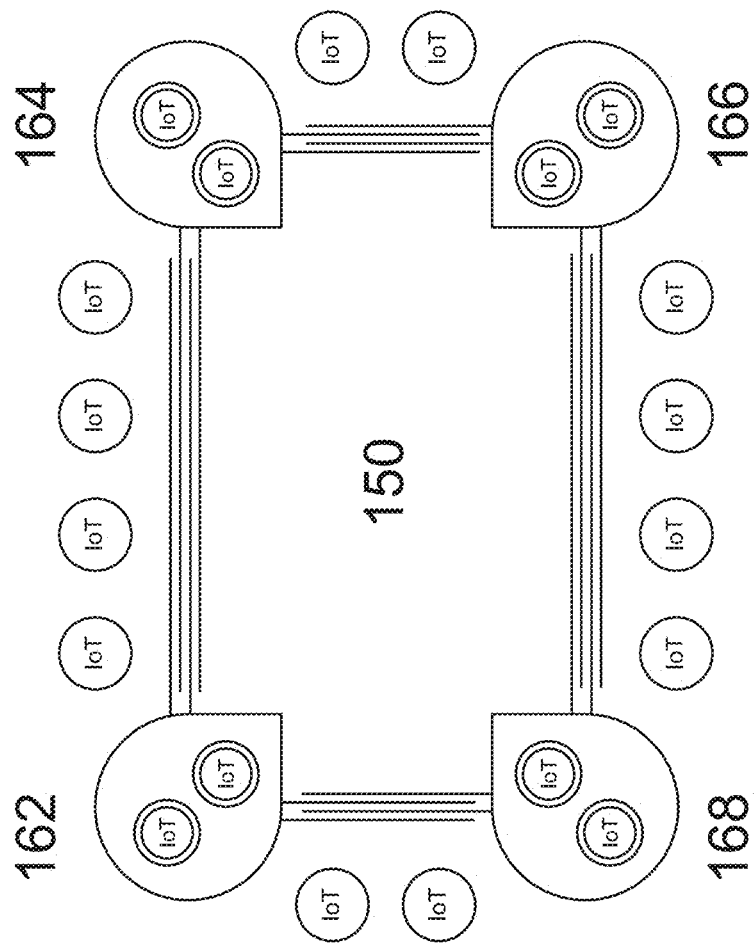
FIG. 4 illustrates a distributed computing pool communicating with IoT nodes in the hybrid blockchain architecture of the invention.
Figure 4:
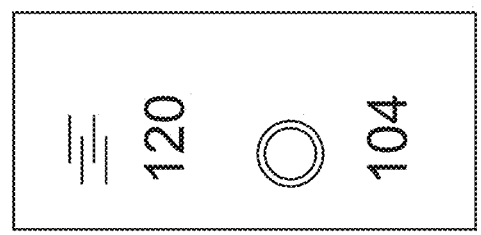

Furthermore, in the hybrid blockchain architecture, IoT blockchain networks 162, 164, 166 and 168 are built for customized products and services, as shown in FIG. 4. For example, IoT blockchain networks 162, 164, 166 and 168 is used for industry IoT, agriculture IoT, traffic IoT and medical IoT, respectively. The function of the hybrid blockchain node 120 includes participating Byzantine agreement of the IoT blockchain networks, and authenticating participants of IoT devices. The function of a tokenized hardware (chip) 104 includes giving a unique and secure authentication for edge devices to allow the "computing pool" 150 to trust the received data, and giving a unique and secure authentication for miners to allow the "computing pool" 150 to trust the delivered data.

Figure 5:
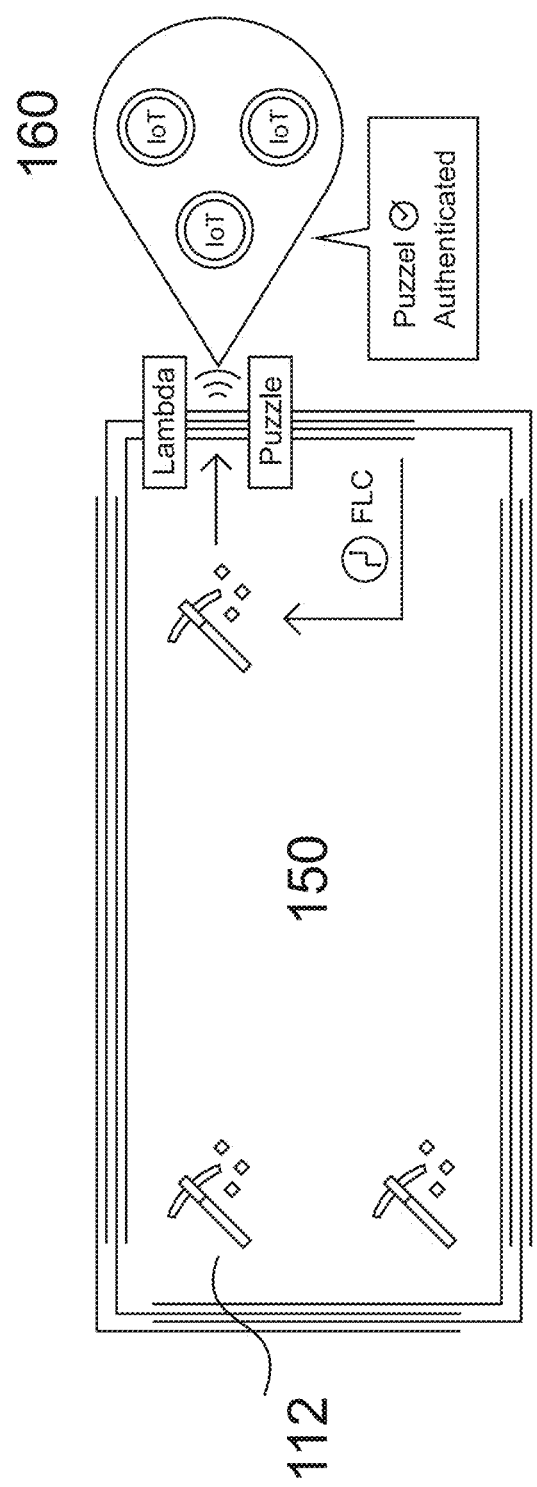
FIG. 5 illustrates an authenticating process of the pseudonymous public-key infrastructure (PPKI) of the invention.

In addition, as shown in FIG. 5, the authenticating process of the pseudonymous public-key infrastructure (PPKI) describes as the following.

1. Miners in the public blockchains produce a set of "Puzzle" and "Lambda value".
2. Hybrid blockchain node obtains the "Puzzle" and "Lambda value" from the public chain.
3. Hybrid blockchain node broadcasts the "Puzzle" to all IoT devices in the private blockchains.
4. During validity period of the "Puzzle", the IoT device that answers the "Puzzle" can become "Authenticated" device during this period.

Furthermore, miners who help to generate the "Puzzle" and participate in the authentication process of trusted devices will be rewarded with token.

Figure 6:
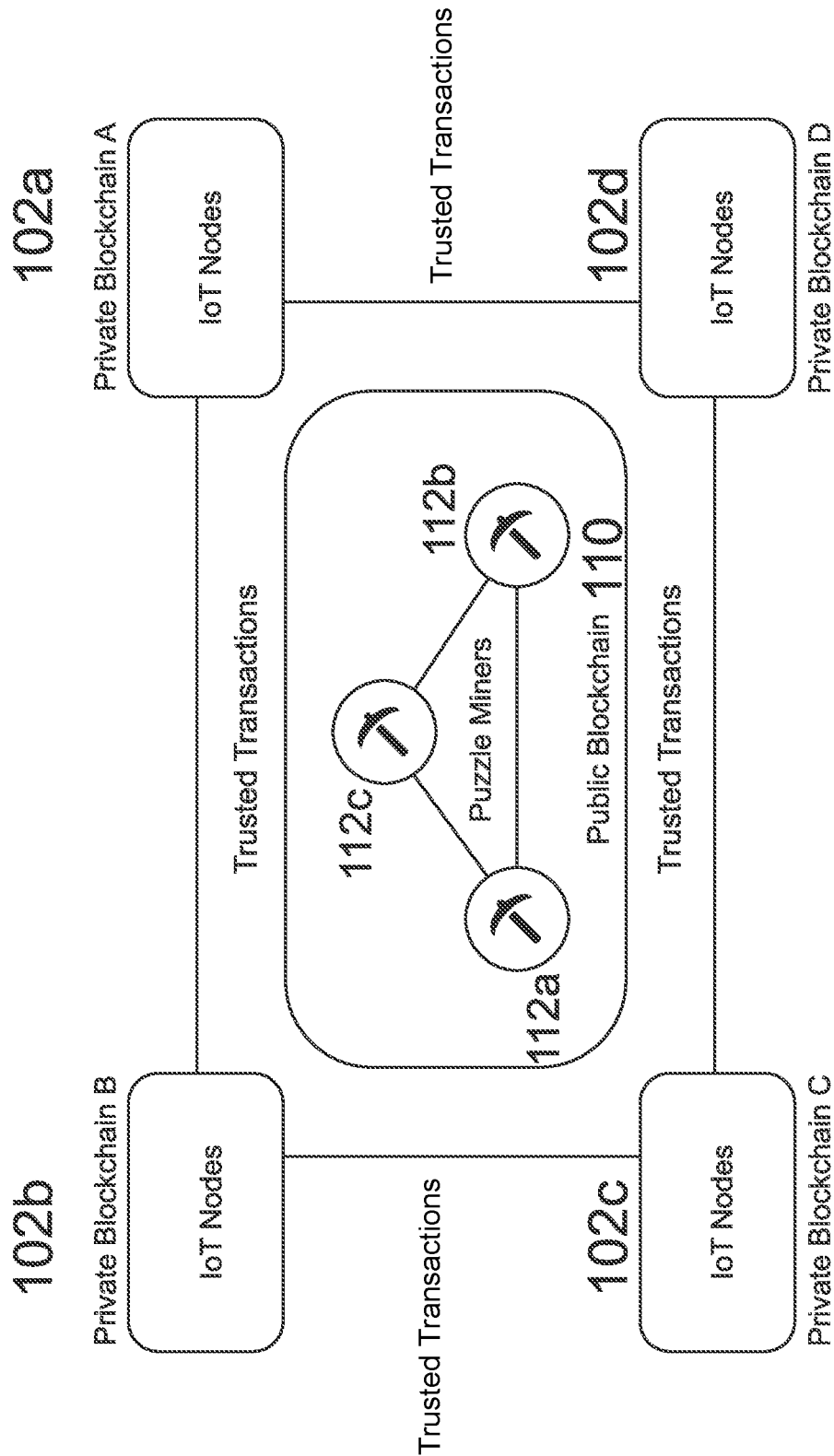
FIG. 6 illustrates a hybrid blockchain network of the invention.

As shown in FIG. 6, it shows the hybrid blockchain network which summarizes that the decentralized IoT application proposed by the invention can provide the settings for today's IoT requirement.

II. The Proposed Model

Hybrid Blockchain Architecture:

Public blockchains, such as Nakamoto blockchain, use the permissionless blockchain to build a trusted machine to read and submit transactions. Furthermore, private blockchains 102a, 102b, 102c and 102d use the permissioned blockchain to build such trusted machine by granting access permissions only to authenticated participants. In the private blockchain network 100, users need to be pre-authenticated before reading and submit transactions. However, the pre-authenticated is time-consuming to achieve near real-time transactions for today's IoT applications. Therefore, the invention proposes the hybrid blockchain architecture designed for the decentralized IoT application that can ensure a near real-time ability to read and submit transactions without such full authentication.

Accordingly, the most important features of the decentralized IoT is a consensus system. The consensus system can verify the transactions from a less trust state to a trusted state, as such, the invention also proposes a fast hybrid consensus system by combining a permissioned public blockchain with a permissionless blockchain to verify transactions over the hybrid blockchain system. In hybrid blockchains, the public blockchain network 110 is accessible by any participants, and the private blockchain network 100 is only opened and accessible to authenticated users. The private blockchain network 100 is a permissioned network such as a wireless sensor network, and a machine learning network that can determine which transactions can be submitted to public blockchains.

In the private blockchain network 100, the users can submit sensory data, issue such data as digital assets, and submit to the hybrid consensus system. The consensus system can determine which transactions are opened to public blockchains for public access. The consensus system can subsequently record such transactions in the public blockchains with openness, trust, provenance, and immutability. More importantly, the decentralized model has been proposed to ensure an openness and trust network by verifying transactions without any central authorizations. Therefore, this present invention introduces the hybrid blockchain model by using the public blockchains to provide such decentralized model.

Figure 7:
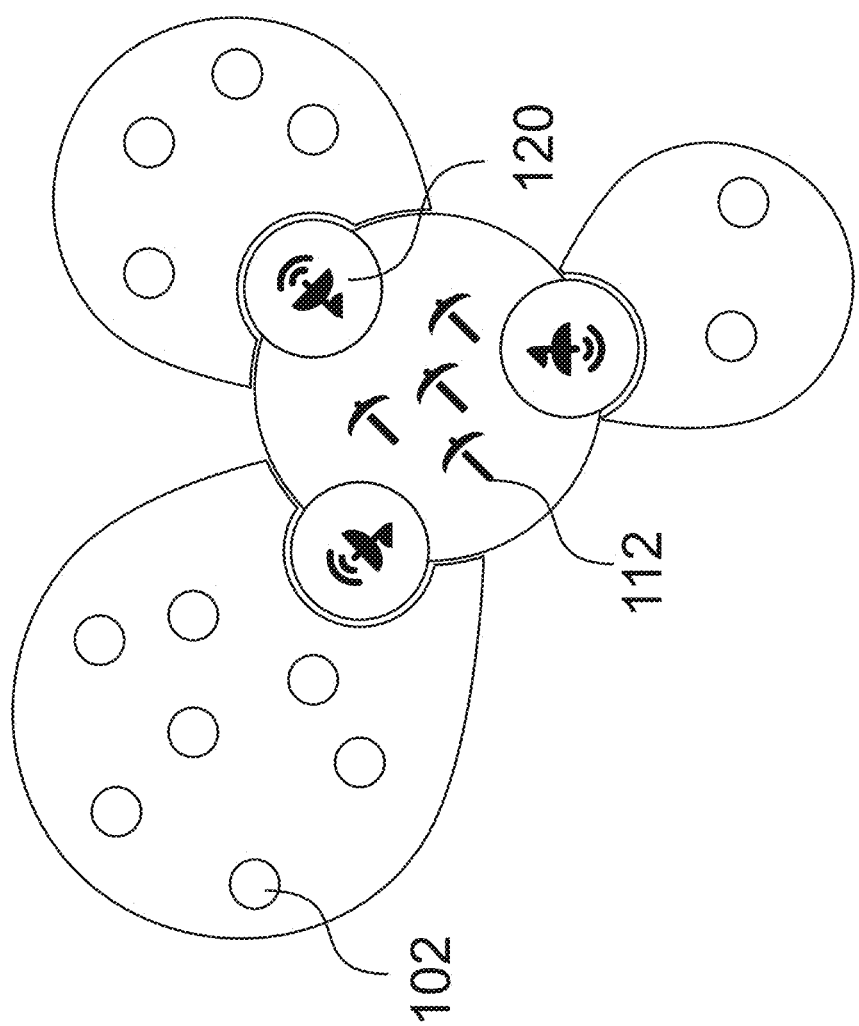
FIG. 7 illustrates puzzle mining and broadcast to private blockchains in accordance with the invention.

As shown in FIG. 7, it shows the process for puzzle mining and broadcasting to private blockchains. FIG. 7 shows that IoT nodes 102 in the hybrid blockchain network are pseudonymously authenticated in the private permissioned blockchain to ensure near real-time transactions.

Pseudonymous Authentication Method:

The distributed computing uses the full authentication technique such as the PKI to control access to their networks. Also, most existing blockchains use such PKI technique to authenticate users, secure the communications and verify transactions by multi-party computation (S. Goldwasser and Y. Lindell. Secure multi-party computation without agreement. Journal of Cryptology, 18(3):247-287, 2005). However, Katz has figured that such PKI technique is too strong to enable a fast communication. Specifically, the IoT blockchain need to authenticate nodes with fast; as such, this present invention proposes the pseudonymous authentication technique to address such technical challenge. The pseudonymous authentication uses the technique of computational puzzles solving to replace the PKI to enable a fast authentication.

Moreover, such PKI technique is too strong that it involves confirming the identity of a user by validating the authenticity of a user with a digital certificate. Unlike a strong authentication technique, the user is anonymous in such pseudonymous authentication system, and the system validates the authenticity of the anonymous user by the consensus of the solution. The pseudonymous authentication uses a weaker but secures enough authenticity system. The blockchains such as Bitcoin which don't use strong authentication systems have proven the notion of pseudonymous authentication to be a tremendous success.

Puzzle Miner Algorithm:

The users, represented as IoT nodes 102 in this invention, can join the private blockchain and submit transactions to the public blockchain by solving a computational puzzle mined by the miners 112. The puzzles are computed by the miners 112 in the public blockchain, and broadcasting to the private blockchains. Hybrid blockchain node 120 receives the puzzles from the IoT nodes 102 in the public blockchain and delivers the puzzles over the p2p network (private blockchain network 100) to the miners 112. As previously described, the pseudonymous authentication needs to ensure a fast validation of the authenticity of an anonymous user. Therefore, this paper proposed that the hybrid blockchain use a lottery function to generate Konami Code that can be used to verify the solution. Formally, let $\lambda$ be Konami Code, a truly random magic string generated by the lottery function, and each puzzle is bound to this Konami Code. Let Fpuz be the puzzle solving function, and Ui represents each user. Then, if the user does not submit the solution of the puzzle to the public blockchains within a fixed time interval, the public blockchain assumes that the user is unauthenticated. Also, the transactions submitted by the unauthenticated user are considered untrusted which can be discarded. Therefore, untrusted transactions will not be recorded in the public blockchain. This invention assumes that the user can solve a puzzle within a fixed time interval a, then the mining process of the miners is as follows.

1. Ui starts receiving A from the broadcasting;
2. Let Puzzle be a function and § j be a string; Ui receives a puzzle (Puzzle, xj) from a peer Uj in the private blockchain over the p2p network;
3. Let Puzzle($\lambda$) gives an arbitrary-length vector $\phi$ of the Konami Code, then $\phi$=(x1, . . . , xn), n≤j;
4. Let Fpuz maintain a set T of puzzle solutions, then Fpuz computes each entries in $\phi$, let yi=Fpuz (xi), i=(1, . . . , j);
5. The miners say that Ui solves the puzzle (Puzzle, xj) if Fpuz successfully finds yi=xj within the time interval $\sigma$;
6. Fpuz returns § j to Uj and stores H=($\phi$, yi, $\lambda$) in T;
7. The miners and Uj confirm the user Ui is authenticated.

Also, the user Ui can thus use H to sign transactions and submit the transactions to the public blockchains for verifying; the submit process be as follows.

1. The trusted user Ui produces a message or receives a message from another user through the p2p network; formally, let M be this message;
2. The trusted user Ui has the keypair ($sk_i$, $pi_i$); let Sign be the signature function;
3. Let Ti be the new transaction and Hash be a hash function so that Ti=Hash (Sign(M), H, $pk_i$);
4. Ui submits Ti to the public blockchain.

Accordingly, regarding the implementation selection, the hash function Hash can be SHA-256, SHA-512, etc.

The Hybrid Consensus:

The public blockchain network can record transactions in the distributed ledgers, the blockchains across all miners after some miners successfully agree on the transactions; the process is called proof-of-work consensus. The transactions recorded in the public blockchain are trusted transactions and immutable. Moreover, the miners should ensure that the transactions are submitted from the authenticated nodes. As such, the hybrid blockchain has a hybrid consensus that can achieve such multi-party trust. The hybrid blockchain provides these settings to support the consensus system for multi-party trust: (1) in the public blockchain, the miners can verify transactions from a pseudonymously authenticated node; (2) the public blockchain network can agree on the transactions by proof-of-work consensus.

Also, the hybrid blockchain can provide the ability to exchange messages between different private blockchains via the public blockchain.

Figure 8:
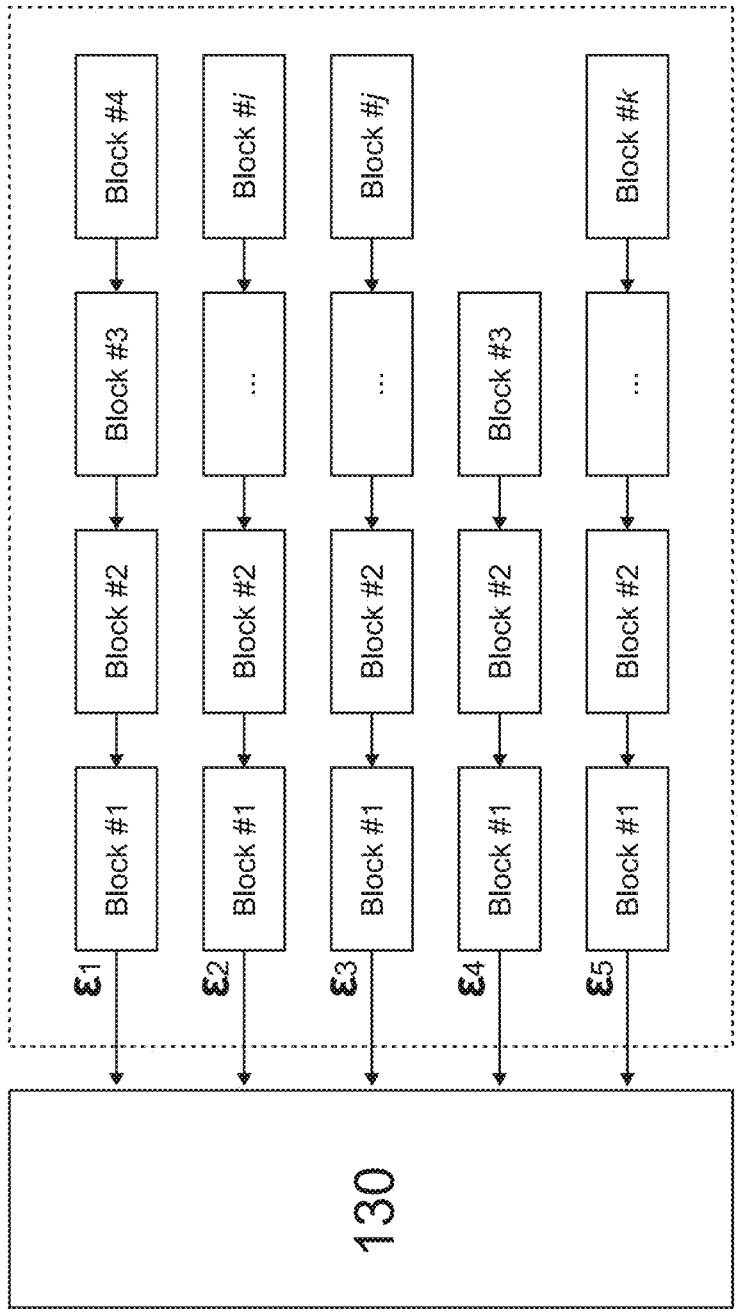
FIG. 8 illustrates virtual blocks and local blockchain in accordance with the invention.

The Local Blockchain:

A private blockchain of the present invention can be built that the IoT devices can self-organize as a p2p network. Every IoT Node in the private blockchain has a local blockchain that keeps the privacy-sensitive data. FIG. 8 depicts the concept of virtual blocks and the local blockchain. The local blockchain starts from the genes is block and is chained by virtual blocks mined by a local miner executing on the IoT node. The algorithm of a local miner is described as the following.

A mining-based proof-of-stake model is provided for IoT devices that the block time, the time to find a valid block, is predictable and can be timed in a fixed number calculation per second. Furthermore, Kraft and Daniel (D. Kraft. Difficulty control for blockchain-based consensus systems. Peer-to-Peer Networking and Applications, 9(2):397-413, 2015) studied the predictable block times for various hash-rate scenarios as the Poisson process with time-dependent intensity. Therefore, the prediction of block times as a Poisson probability density function is modeled to ensure a cost-effective difficulty control system. FIG. 9a depicts the concept of this mining process.

1. The block time is determined by P, the Poisson distribution function;
2. The value of P is resulted by stakes such as the battery level and WiFi signal strength;

3. At the time t1, P predicts that if the termination time of the current block is exactly early than the end of t1, then block #1 is successfully mined;
4. The local miner continues the step 2 and 3 to mine more virtual blocks.

In FIG. 5a, the local miner predicts that block #2 can be found at t2, and block #4 can be found at t9. The block time of block #4 is longer than expected because that the WiFi signal is weak at time t4 to t8. Time t1 to t12 is fixed block time, and block #1 to #5 is virtual block.

Furthermore, the Byzantine agreement is a consensus algorithm to avoid distort data (L. Lamport, R. Shostak, and M. Pease. The byzantine general problem. ACM Transactions on Programming Languages and Systems, 4(3):382-401, 1982) across p2p nodes. The Byzantine agreement can be found in many database systems to ensure data replication and redundant. Technically, the Byzantine agreement is a distributed decision-making process that some amounts of nodes are agreed on transactions and can replicate the data; such a mechanism is also known as fault-tolerance, and Byzantine agreement is known as Byzantine Fault-Tolerant (BFT). Therefore, the private blockchain can also agree on the private transactions by fault-tolerance, meaning that the p2p network in the private blockchain can replicate a certain of private transactions.

In general, if a maximum number of n node can distort data, a BFT algorithm can be achieved with a total of 3n+1 nodes to tolerate the network. However, if nodes can not distort application data submitted through them, then an amount of 2n+1 nodes is capable of tolerating the network. There are various BFT implementations such as Practical Byzantine Fault-Tolerant (PBFT) (M. Castro and B. Liskov. Practical byzantine fault tolerance. In Proceedings of the Third Symposium on Operating Systems Design and Implementation, OSDI '99, pages 173-186, Berkeley, Calif., USA, 1999. USENIX Association), and Speculative Byzantine Fault Tolerant (Zyzzyva) (R. Kotla, L. Alvisi, M. Dahlin, A. Clement, and E. Wong. Zyzzyva: Speculative byzantine fault tolerance. SIGOPS Oper. Syst. Rev., 41(6):45-58, October 2007) can be employed in the private blockchains of the proposed hybrid model. The implementation is a selection according to the difference in their business logic.

The Local Mining:

The present invention proposes that the IoT nodes can use the virtual blocks concept to store local transactions. IoT nodes can temporarily store their transactions in the virtual blocks and submit the stored transactions to the private blockchain network for replicating. This setting, called gathering transactions, can provide additional abilities to hybrid blockchains as follows: (i) the IoT nodes can submit real-time sensitive transactions immediately to the public blockchain and save the transactions in the virtual blocks; (ii) the IoT nodes can gather and store none real-time sensitive transactions in virtual blocks as well; (iii) the IoT nodes can submit their virtual blocks to the private blockchain for data replication.

As described previously, a local miner is proposed by which virtual blocks are mined. Moreover, a genesis block 130 is pre-defined by the private blockchain developers. As FIG. 4 previously figured that the genesis block 130, formally denoted as G, which is pre-defined by private blockchain developers, and there are given entities ε1, ε2, ε3, ε4, and ε5 in a private blockchain. As such, FIG. 5a depicts the process of local mining, and the following example shows ε1.

1. The public blockchain has σ slices per second, meaning that the puzzle miner uses a fixed time interval mining mechanism;
2. The puzzle miners in the public blockchain are broadcasting λ1 at time t1;
3. The Flowchain node ε1 has a sensory data, formally denoted M, and ε1 generates a transaction T1=Hash (Sign(M), H, pki);
4. The Flowchain node ε1 successfully mines Block #1 after Fpuz solving the puzzle bound with λ1, and stores T1 in virtual block Block #1 of ε1;
5. ε1 repeats steps 2, 3, and 4, until the end of a slices and resulting in a total number of 5 transactions, [T1, . . . , T5], which were stored in virtual block Block #1;
6. ε1, subsequently continues to get λ2 at t1, as well as resulting in 10 transactions, [T6, . . . , T15], which were stored in virtual block Block #2;
7. At the time t3, the IoT node ε1 submits [T1, . . . , T15] in the virtual blocks, Block #1 and Block #2, to the private blockchain network;
8. All authenticated nodes in the private blockchain can join the consensus activity to agree on [T1, 1 . . . , T15], that all the transactions will become trusted;
9. The BFT consensus can ensure that trusted transactions [T1, 1 . . . , T15] were replicated in the private blockchain, meaning that the private blockchain is capable of fault-tolerance of private trusted transactions.

Figure 9B:
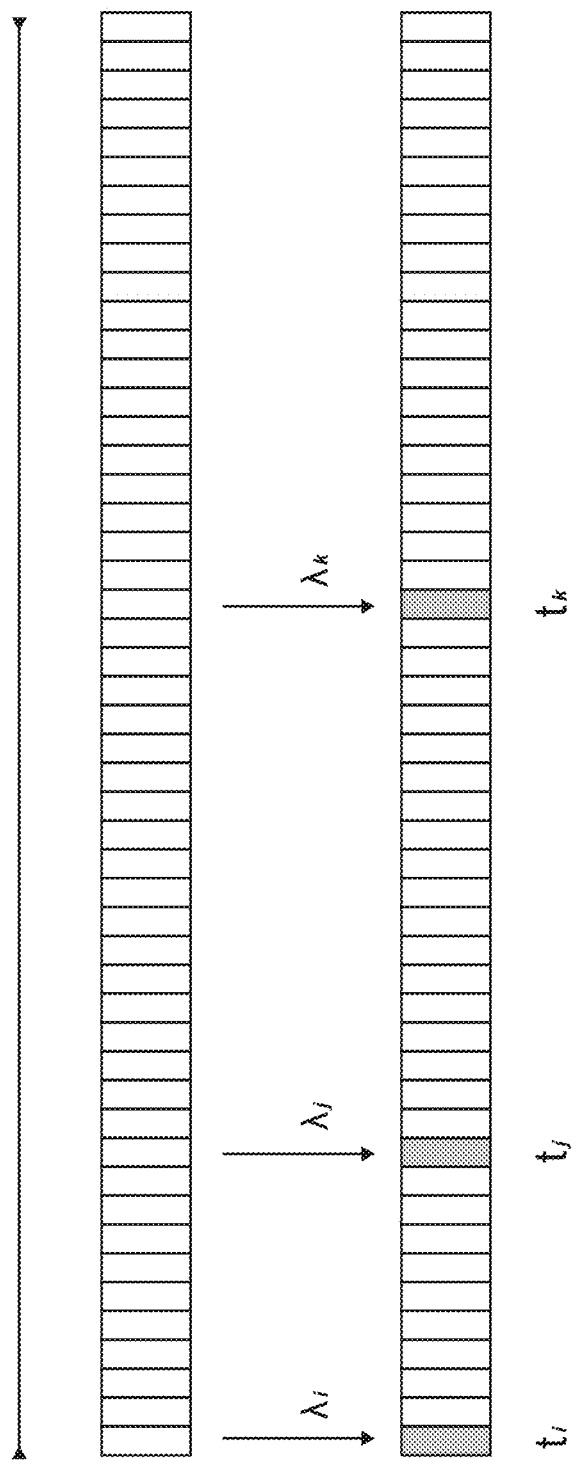
FIG. 9b illustrates a pseudonymous authentication in accordance with the invention.

FIG. 9b shows such local mining technique that an IoT node was pseudonymously authenticated to submit transactions at ($t_i$, $t_j$, $t_k$), wherein fixed time interval scheduling of puzzle miners is 50 slices per second. Furthermore, the above process also gives the deferred submission concept. The IoT node can gather transactions in its virtual blocks and submit gathered transactions to the public blockchain in a future time. The blockchain model provides additional advantages for the IoT; thus, this invention selects the blockchain technology to provide a decentralized and secure IoT network. Table 1 summarizes the results of the proposed work to highlight attributes of a promising IoT blockchain.

TABLE 1

| The attributes of the perfect blockchain | |
|---|---|
| Perfect blockchain | The proposed model |
| Predictable block times: | The invention uses the probability density function to predict block times. |
| Stability of block times: | The invention uses a periodical mining system to ensure the stability of block times. |
| An alternative difficulty control: | The invention uses a PoS miner to control the mining difficulty. |
| Secure and trusted transactions: | The invention uses the hybrid blockchain model together with the pseudonymous authentication technique to ensure secure and trusted transactions. |

III. The IoT Blockchain Economy

Describing the benefits of a new blockchain technology in the economy is fundamental. Thus, in addition to the blockchain technology, the proposed work also describes the blockchain economy: how blockchain technology can benefit the IoT technology as well as why the blockchain technology is necessary for the next-generation IoT innovation. More specially, this section also describes how to adapt the proposed hybrid blockchain model to gain such benefits.

Tokenized Hardware:

There are various types of tokens currently existing in the cryptocurrency economic, such as utility token, security token, and coins. The SEC recently announced to consider Initial Coin Offering (ICO) as securities which could be a good thing since the ICOs as securities is a new viable way to raise funds, called tokenized securities. In this invention, the tokenized hardware is proposed, another new viable way to hardware manufacturing and production for open hardware economic. Tokenized hardware can ensure the assets of the hardware rights, data privacy, and data security by hardware tokens. Therefore, this invention also proposes the concept of tokenized hardware that the hardware ecosystem comprised of manufacturers, developers, and consumers can collaborate on mining to mine a fixed amount of hardware tokens. The tokenized hardware technology is considered to represent a revolutionary innovation to build more trust and secure hardware.

Figure 10:
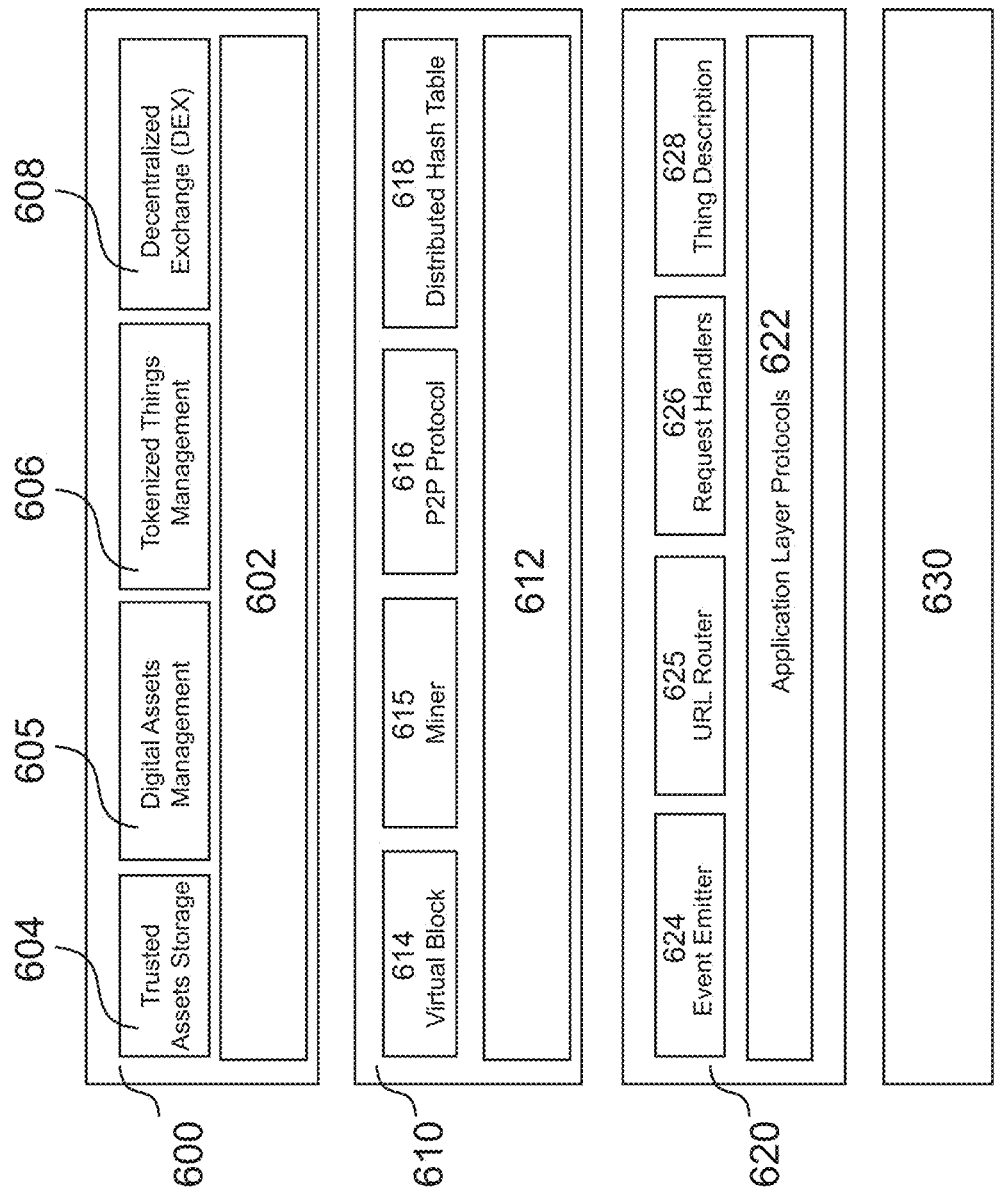
FIG. 10 illustrates a software on a hybrid blockchain IoT node in accordance with the invention.

Furthermore, the crypto has become an emerging technology for creating more secure and decentralized systems. Ethereum platform, an Ethash-based blockchain system, uses such technology to issue tokens, which can be utilized as cryptocurrency that can be traded in any central exchange. Accordingly, startups can also raise funds by selling virtual shares in the form of security tokens, called tokenized security. Moreover, the underlying infrastructure of IoT blockchain technologies is consolidated by the orchestration of hardware and software components that can support the implementation of cryptographic technologies. As such, FIG. 10 presents that the proposed software architecture can implement the tokenized hardware or firmware. The software architecture on IoT nodes comprises a distributed ledger layer 600, a broker server layer 610, web of things layer 620 and a JavaScript runtime 630. The distributed ledger layer 600 includes tokenized hardware and p2p trusted computing 602 for coin, a trusted assets storage 604, a digital assets management 605, a tokenized things management 606 and a decentralized exchange (DEX) 608. The broker server layer 610 includes the light-weight RPC over REST-type operations 612, virtual block 614, miners 615, P2P protocol 616 and distributed hash table 618. The web of a things layer 620 includes application layer protocols 622, event emitter 624, URL router 625, request handlers 626 and thing description 628.

Web of Things Layer 620: The connection mode between Edge Devices, each device of IoT is represented by a URL, in the de-centralized Internet of Things, the W3C standard and WoT management resources are implemented, so that the underlying Internet of Things resources can be stored and read.

The broker server layer 610: Conversion between public blockchain and private blockchain, a hybrid blockchain structure consists of an AI computing mining pool (public blockchain) and multiple IoT blockchains (private blockchains).

The benefits of IoT Blockchain:

It is the token fundamentals to define the benefits the customers gain from holding tokens, thus, linking viable benefits with token usage models is a critical issue in the proposed invention. The benefits customers gain from utility tokens are as the following examples: 1. access the basic cloud service; 2. after-sales service; and 3. purchase discount.

The amount of total supply of utility tokens equals to the total quantity of each shipment, and utility tokens must record their benefits provided on public blockchains, such as Ethereum and Hyperledger. In short, utility tokens can grant permissions to authorized hardware for accessing cloud service, request for the after-sales service, and other available benefits provided by hardware manufacturers. Also, unlike public blockchains, private blockchains are permissioned blockchains that are controlled by their operators, and only grant permissions to authorized users; thus, each shipment of the hardware can be employed as a private blockchain by which utility tokens are mined.

Internet of Things (IoT) is a connected device enables the sensory data transfers to the Internet, and applications can participate the IoT device to access these sensory data. For participating the IoT device, the participants have to pay the device for data access. Unlike utility tokens, the payment is in cryptocurrencies, such as Bitcoin and ERC20 currencies, which uses encryption techniques to regulate the generation units of the cryptocurrency and verify the transaction of funds.

Moreover, unlike fiat currencies, cryptocurrencies are usually operating independently without a central bank and can be minted on public blockchains, such as Ethereum. In conclusion, the payment of funds is achieved with cryptocurrencies in a peer-to-peer (P2P) manner, called client-to-client (C2C) model.

The WiFi camera is a use case among tokenized hardware products. The WiFi camera is a tangible asset while the video streams produced by the camera are digital assets, in short, the tokenized camera is an asset comprised of the hardware asset and the digital assets, and the token holder has the rights to use these assets. Subsequently, the blockchain can issue access tokens to users who want to access the digital data from the camera. As such, there is a use scenario of such tokenized camera hardware.

1. John has an app on his mobile phone;
2. An app pays some units to the WiFi camera;
3. The blockchain issues an access token to mobile apps after verifying the transactions;
4. The app starts with received video streams, the digital assets of the tokenized hardware;
5. John can watch the video from the camera.

Such use scenario is a use case of tokenized hardware proposed by this invention; nevertheless, connected tokenized hardware is defined as Tokenized Things compare to the traditional Internet of Things (IoT). Also, technically, a tokenized thing has to be represented as Virtual Things with the ontology of Web of Things (WoT) and operates in a p2p manner. Therefore, this invention has also developed the Devify software framework, a generic and comprehensive software framework based on the proposed architecture for building p2p IoT networks.

Incentive:

One of the most visible impacts is that the hybrid blockchains have to provide an incentive design. A favorable incentive design can help to build a sustainable blockchain network and keep the network healthy, meaning that the incentive can encourage participants to support the blockchain network by participating in the activities of the public blockchains, such as puzzles mining as previously described.

In the proposed hybrid blockchain model, the public blockchain can fund incentive either by puzzles mining, proof the existence of specific application data or run smart contracts.

Puzzles Mining—Participants have to join the public blockchain network and spend their time to generate and broadcast puzzles.

Proof of Existence—A transaction exists if it has been verified and recorded in the public blockchain. The miners can assist smart contracts for validating the existence of a transaction, call proof of existence. More importantly, the proof of existence can ensure the data trust and provenance.

Hosting Smart Contracts—The smart contract is one type of the decentralized applications (Dapps), and in the proposed hybrid blockchain model, the developers can build a private blockchain, develop smart contracts for their private blockchain, and deploy smart contracts to the public blockchain for invocation.

Figure 11:
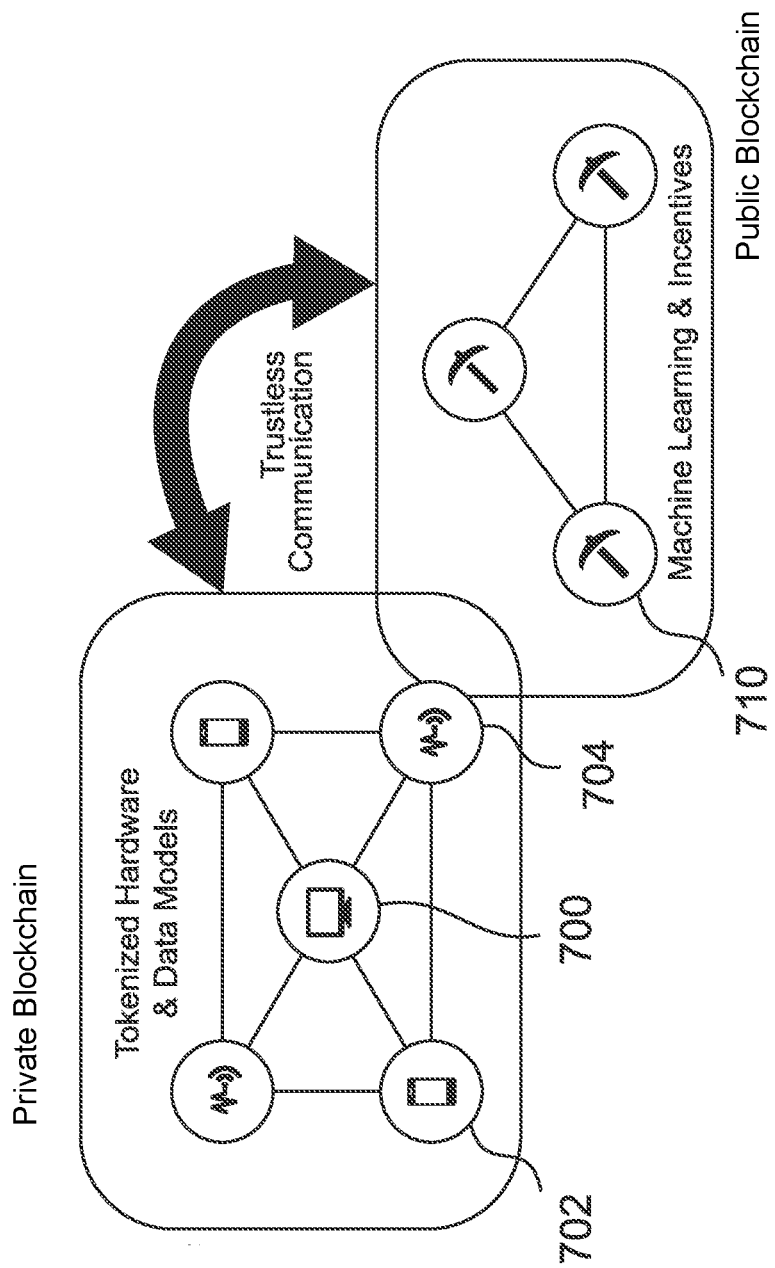
FIG. 11 illustrates a hybrid blockchain architecture for the IoT and AI in accordance with the invention.

To conclude the contribution of the proposed invention, it illustrates the machine learning network as an example. Hybrid blockchain comprises of private permissioned and public permissionless blockchains that can enable the machine learning on IoT Blockchain with the allowance of multiple organizations to perform collaborative data analytics and machine learning while guaranteeing the data privacy of their datasets. The consortium blockchain is a type of hybrid blockchain that it allows multiple organizations to exchange trusted transactions through the public blockchain. The organization has their private blockchain, and the hybrid consensus can ensure the multi-party trust as previously described. FIG. 11 depicts the hybrid blockchain architecture that can enable such machine learning network on the Hybrid blockchain. The invention has already built Hybrid blockchain for proof-of-concept accessible.

As shown in FIG. 11, the hybrid blockchain architecture for the IoT and AI. The IoT devices 702 can be tokenized to ensure their trust and submit datasets by the device 704 to the public blockchain for data analysis by the miner 710. The center computer 700 will manage the IoT devices 702 and device 704. The tokenized hardware and data models are performed in the private blockchain. The machine learning and incentives are performed in the public blockchain. A trustless communication is enabled between the public blockchain and the private blockchain.

Figure 12:
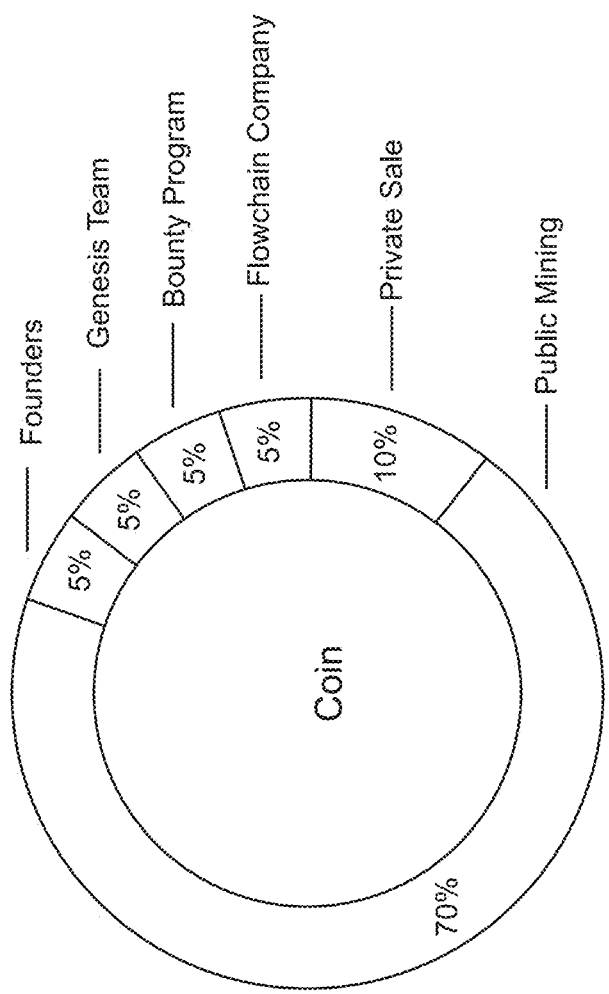
FIG. 12 illustrates an issuance mode of coin of the invention.
Figure 13:
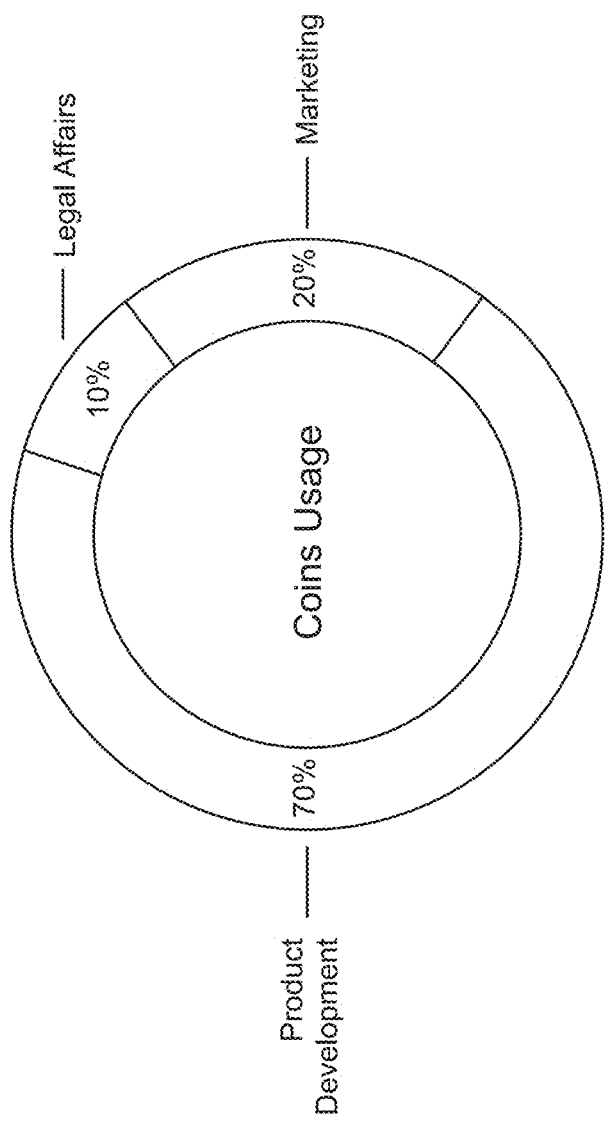
FIG. 13 illustrates a usage of coins of the invention.

In the proposed platform ecosystem, miners are rewarded with token by assigning AI computing and consensus tasks "mining" through computing pools. In the issuance mode, 80% of the total issuance of tokens will be issued in the form of virtual mining (PPoW). In one example, the issuance mode of coin is as shown in FIG. 12, in which public mining, private sale, company, bounty program, genesis team and founders are 70%, 10%, 5%, 5%, 5%, 5% of the total issuance of tokens, respectively. In another example, the usage of coins is as shown in FIG. 13, in which product development, marketing, legal affairs are 70%, 20%, 10% of the total coins, respectively. In PPoW mechanism, "Equity" is used as the basis of AI computing task allocation.

It will be understood that the above descriptions of embodiments are given by way of example only and that various modifications may be made by those with ordinary skill in the art. The above specification, examples and data provide a complete description of the structure and use of exemplary embodiments of the invention. Although various embodiments of the invention have been described above with a certain degree of particularity, or with reference to one or more individual embodiments, those with ordinary skill in the art could make numerous alterations to the disclosed embodiments without departing from the spirit or scope of this invention.

What is claimed is:

1. A hybrid blockchain architecture, comprising:
a hybrid blockchain physical network node;
an Internet of Things (IoT) blockchain network that is a private blockchain network and is coupled to said hybrid blockchain node; and
a communication blockchain network that is public blockchain network and is coupled to said hybrid blockchain node, wherein said communication blockchain network is selected from an internet network, wifi network, Bluetooth network and telecommunication network;
wherein a distributed computing pool is built by said communication blockchain network and said Internet of Things (IoT) blockchain network to share a computing capability for a device;
wherein the hybrid blockchain node broadcasts puzzles obtained for the communication blockchain network to IoT devices in the Internet of Things (IoT) blockchain network, the puzzles are generated by miners of the communication blockchain network, and IoT device of the IoT devices that submits a transaction comprising a correct solution to the puzzles within a predetermined time period is determined to be an authenticated device, and a miner that participates in authenticating the IoT device receives a reward token and records the transaction in a distributed ledger.

2. The architecture as set forth in claim 1, wherein said hybrid blockchain node is used to distribute computing within said computing pool.

3. The architecture as set forth in claim 1, wherein said distributed computing pool includes distributed miners.

4. The architecture as set forth in claim 1, wherein said IoT blockchain network uses a pseudonymous public-key infrastructure (PPKI) to authenticate IoT devices and ensure data security as well as data privacy.

5. The architecture as set forth in claim 1, wherein said hybrid blockchain node is employed to participate Byzantine agreement of said IoT blockchain network, and authenticate participants of IoT devices.

6. The architecture as set forth in claim 1, wherein IoT devices in said Internet of Things (IoT) blockchain network decide which data can be public by submitting transactions of said data to said communication blockchain network.

7. The architecture as set forth in claim 1, wherein the Internet of Things (IoT) blockchain network has multiple IoT nodes.

8. The architecture as set forth in claim 1, wherein said communication blockchain network can verify said transactions and record verified transactions in distributed ledgers across puzzle miners.

9. The architecture as set forth in claim 1, wherein a group of data is collected from the miners and sent back to said computing pool.

10. The architecture as set forth in claim 9, wherein Artificial Intelligence (AI) computed by said miners is sent back to said IoT blockchain network for upgrading AI of IoT devices.

11. The architecture as set forth in claim 1, further comprising a machine learning network to determine which transactions can be submitted to said communication blockchain network.

12. The architecture as set forth in claim 1, wherein said IoT blockchain network is built for customized products and services.

13. The architecture as set forth in claim 1, further comprising a tokenized hardware to provide a unique and secure authentication for edge devices to allow said computing pool to trust received data, and give said unique and secure authentication for miners to allow said computing pool to trust delivered data.

14. The architecture as set forth in claim 1, wherein in said communication blockchain network, a puzzle miner can verify transactions from a pseudonymously authenticated node, wherein said communication blockchain network can agree on said transactions by proof-of-work consensus.

15. The architecture as set forth in claim 1, wherein IoT nodes in said Internet of Things (IoT) blockchain network can self-organize as a per to-peer network.

16. The architecture as set forth in claim 1, wherein each of IoT nodes in said Internet of Things (IoT) blockchain network has a local blockchain that keeps a privacy-sensitive data.

17. The architecture as set forth in claim 16, wherein said local blockchain starts from a genesis block and is chained by virtual blocks mined by a local miner executing on at least one IoT node of said IoT nodes.

18. The architecture as set forth in claim 17, wherein said IoT nodes can use said virtual blocks to store local transactions.

19. The architecture as set forth in claim 18, wherein said IoT nodes can temporarily store their transactions in said virtual blocks and submit said temporarily stored transactions to said Internet of Things (IoT) blockchain network for replicating.

20. The architecture as set forth in claim 17, wherein said IoT nodes can submit real-time sensitive transactions immediately to said communication blockchain network and save said transactions in said virtual blocks, said IoT nodes can gather and store none real-time sensitive transactions in said virtual blocks as well, and said IoT nodes can submit said virtual blocks to said Internet of Things (IoT) blockchain network for data replication.

\* \* \* \* \*